United States Patent
Casters

(10) Patent No.: US 10,392,755 B2
(45) Date of Patent: Aug. 27, 2019

(54) MACHINE FOR REALIZING PAVEMENTS

(71) Applicant: Consulting Casters BVBA, Opglabbeek (BE)

(72) Inventor: Francois Casters, Opglabbeek (BE)

(73) Assignee: Consulting Casters BVBA, Opglabbeek (BE)

( * ) Notice: Subject to any disclaimer, the term of this patent is extended or adjusted under 35 U.S.C. 154(b) by 0 days.

(21) Appl. No.: 15/120,277

(22) PCT Filed: Feb. 19, 2015

(86) PCT No.: PCT/IB2015/051260
§ 371 (c)(1),
(2) Date: Aug. 19, 2016

(87) PCT Pub. No.: WO2015/125097
PCT Pub. Date: Aug. 27, 2015

(65) Prior Publication Data
US 2017/0058465 A1 Mar. 2, 2017

(30) Foreign Application Priority Data

Feb. 21, 2014 (BE) .................................. 2014/0120

(51) Int. Cl.
*E01C 19/00* (2006.01)
*B62D 21/14* (2006.01)
(Continued)

(52) U.S. Cl.
CPC .............. *E01C 19/00* (2013.01); *B62D 21/14* (2013.01); *B62D 21/18* (2013.01); *B62D 21/186* (2013.01);
(Continued)

(58) Field of Classification Search
CPC .. E01C 19/00; E01C 2301/00; E01C 2301/18; E01C 23/00; E01C 23/04; B62D 21/14; B62D 21/186
See application file for complete search history.

(56) References Cited

U.S. PATENT DOCUMENTS 4,789,266 A * 12/1988 Clarke, Jr. ............ E01C 19/187
404/104
6,390,728 B1 5/2002 Casters
(Continued)

FOREIGN PATENT DOCUMENTS

BE 895198 A2 3/1983
BE 895199 A2 3/1983
(Continued)

OTHER PUBLICATIONS

International Search Report and Written Opinion completed May 13, 2015 pertaining to PCT/B2015051260 filed Feb. 19, 2015.

*Primary Examiner* — Abigail A Risic
(74) *Attorney, Agent, or Firm* — Dinsmore & Shohl LLP

(57) ABSTRACT

Device for realizing surfacing, in general, realizing surfaces that differ in nature, and more especially for realizing concrete pavements. In particular, it concerns a machine for realizing concrete roads, more especially a type of machine where work can be done without lateral formwork, in such way that after the machine has passed, the road is completely finished and that one only has to wait for the concrete to set and possibly seal the expansion joints before commissioning the road.

14 Claims, 3 Drawing Sheets

Figure 1:
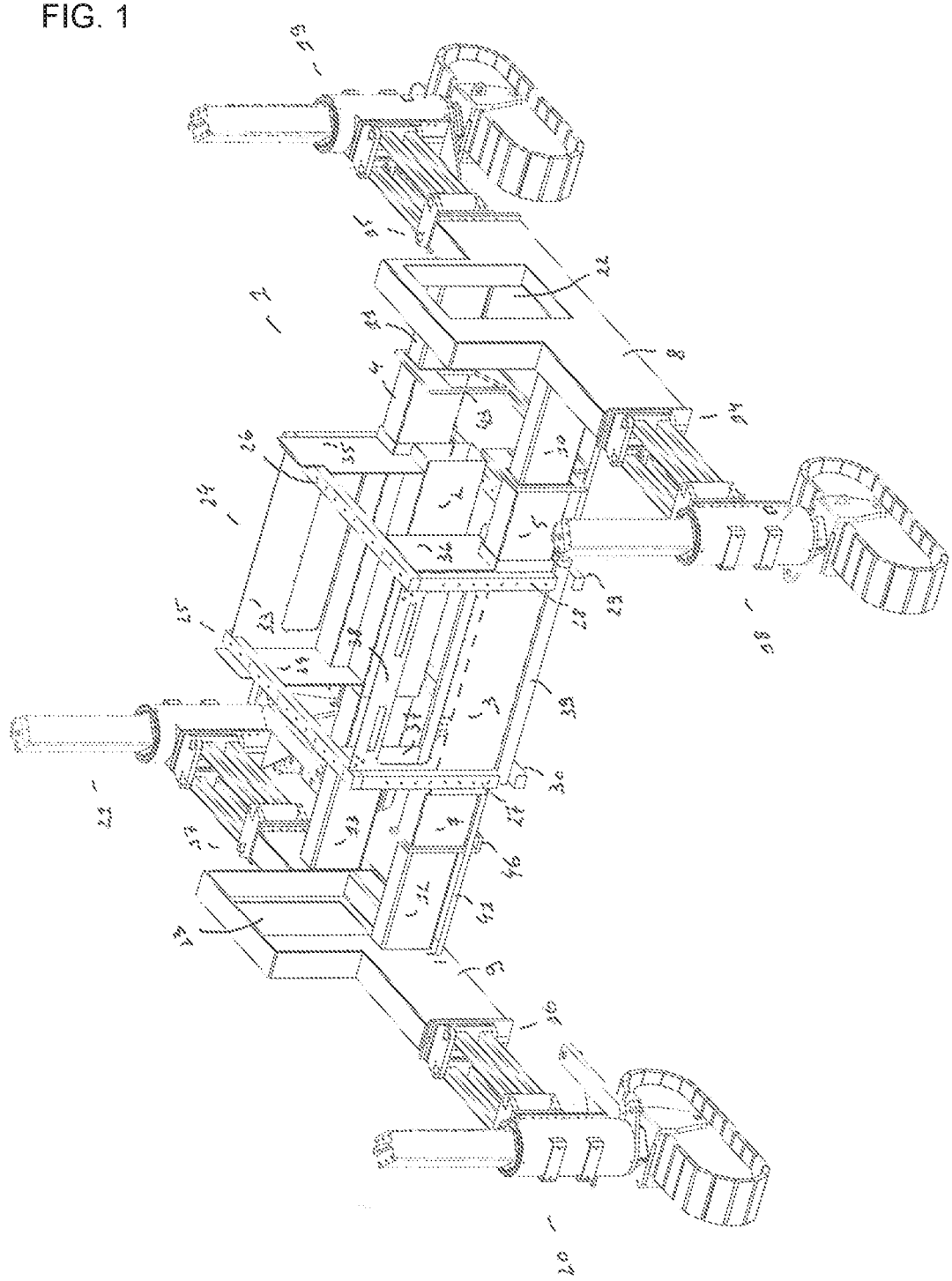

(51) Int. Cl.
*B62D 21/18* (2006.01)
*B62D 55/06* (2006.01)
B62D 55/065 (2006.01)

(52) U.S. Cl.
CPC ........ *B62D 55/065* (2013.01); *E01C 2301/00* (2013.01); *E01C 2301/18* (2013.01)

(56) References Cited

U.S. PATENT DOCUMENTS

| | | | |
|---|---|---|---|
| 6,471,442 B1* | 10/2002 | Deeb | E01C 19/40 404/105 |
| 6,481,923 B1* | 11/2002 | Casters | E01C 19/40 404/104 |
| 7,950,874 B2* | 5/2011 | Guntert, Jr. | E01C 19/42 404/105 |
| 9,663,162 B1* | 5/2017 | Pedersen | B62D 55/084 |
| 9,689,119 B2* | 6/2017 | Dahm | E01C 19/4886 |
| 2002/0044831 A1 | 4/2002 | Leone et al. | |
| 2010/0266339 A1 | 10/2010 | Guntert, Jr. et al. | |
| 2011/0236129 A1* | 9/2011 | Guntert, Jr. | E01C 19/42 404/72 |
| 2016/0177517 A1* | 6/2016 | Engels | G06T 7/20 404/75 |
| 2016/0305075 A1* | 10/2016 | Thieme | E01C 19/004 |
| 2017/0089017 A1* | 3/2017 | Dahm | E01C 19/22 |
| 2017/0159249 A1* | 6/2017 | Engels | E01C 19/4873 |

FOREIGN PATENT DOCUMENTS

| | | |
|---|---|---|
| BE | 1002820 A6 | 6/1991 |
| DE | 19814052 A1 | 10/1999 |

* cited by examiner

MACHINE FOR REALIZING PAVEMENTS

This invention concerns a device for realizing surfacing, in general, realizing surfaces that differ in nature, and more especially for realizing concrete pavements. In particular, this invention concerns a machine for realizing concrete pavements, more especially a type of machine where work can be done without lateral formwork, in such way that after the machine has passed, the road is completely finished and that one only has to wait for the concrete to set and possibly seal the expansion joints before commissioning the road.

BACKGROUND TO THE INVENTION

The machine's design consists of a skeleton (1) that is formed by two parallel support beams (8,9) and crossbars perpendicular to them (10, 11, 12, 13), which are retractable and expandable within a frame (2, 3), in order to be able to change to machine's working width. The ends (14, 15, 16, 17) of the parallel support beams have been fitted with rollers (18, 19, 20, 21) that facilitate the machine moving in the right direction. In such machines, the resources required for dividing, vibrating and leveling the concrete, such as a divide screw, a vibrating device and a leveling device are suspended at the bottom of such an extendable skeleton. In these machines, the operating resources, such as the motor, the controls and the driver's seat are fitted on top of the aforementioned skeleton. In this regard, it is normal that a platform is placed on top of the central frame (2, 3).

Examples of the said machines for realizing concrete pavements, with further details on the rollers and the resources that are suspended at the bottom of the skeleton can, for example, be retrieved from U.S. Pat. No. 6,390,728, BE895198, BE895199 and BE1002820. The disadvantage of the existing machines is that they are mostly too large and too heavy, and can therefore only be moved as exceptional transport with the associated regulations. Moreover, the diesel engines in these machines have to comply with the new regulations with regard to emissions, namely TIER 4 FINAL engines, which require bigger engine rooms, and it therefore, with the current configuration, becomes more difficult to keep these machines outside of the scope of the regulations with regard to exceptional transport. Besides the disadvantage with regard to the size and weight of these machines, the design of the engine and the control devices on top of the frame have an additional disadvantage that the driver's vision is impaired, through which it becomes difficult to operate the device in all the driving directions. Besides, the extendable skeleton in the existing machines is operated by means of a single cylinder on each side (see cylinders 29 and 60 in FIG. 1 of BE1002820). The slightest warping can block the angled crossbars in the frame.

One of the objectives of this invention is to offer a solution to the aforementioned problems with the existing paving machines, whereby the machines can comply with the TIER 4 FINAL standards, and, at the same time, can fall outside of the regulations with regard to exceptional transport.

SHORT DESCRIPTION OF THE DRAWINGS

FIG. 1: Perspective view from above of a paving machine according to this invention.

Figure 2:
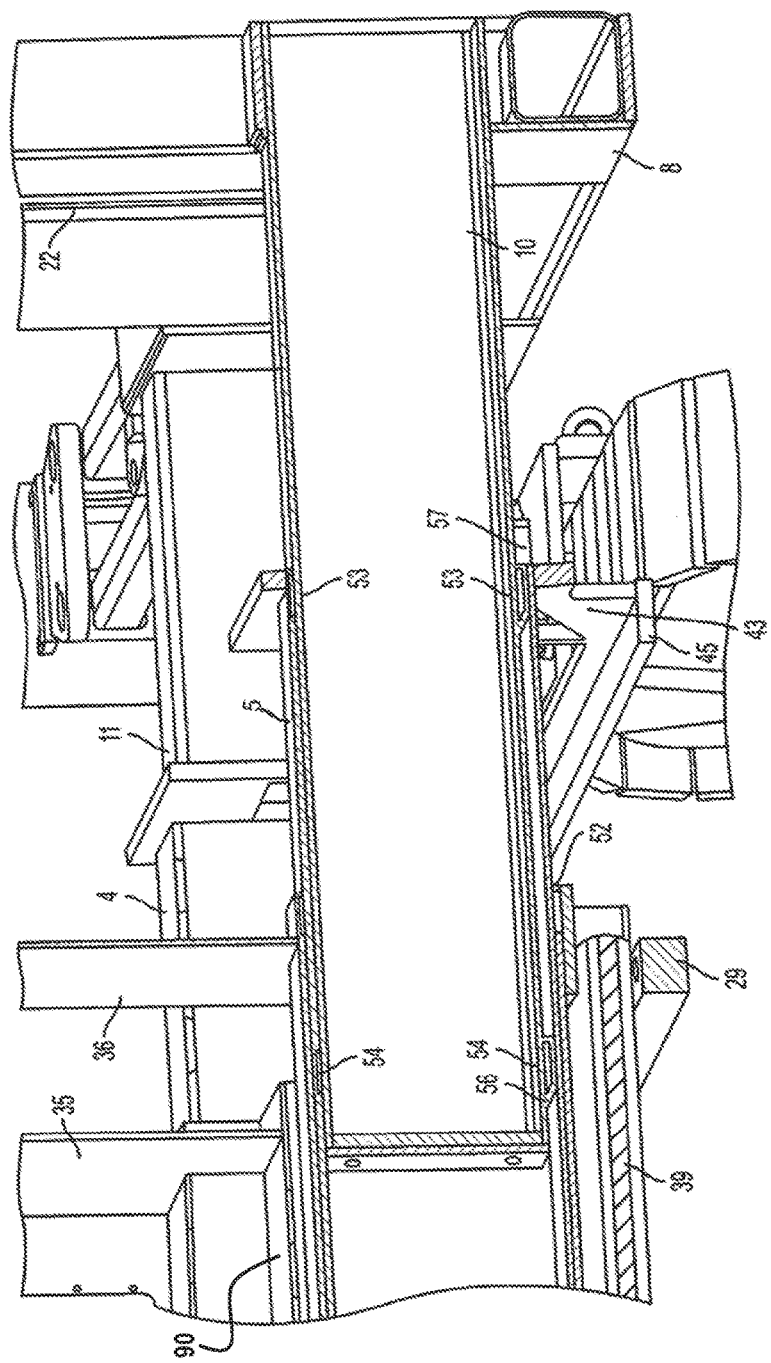

FIG. 2: Perspective longitudinal cross-section through crossbar 10 of the machine as shown in FIG. 1.

Figure 3:
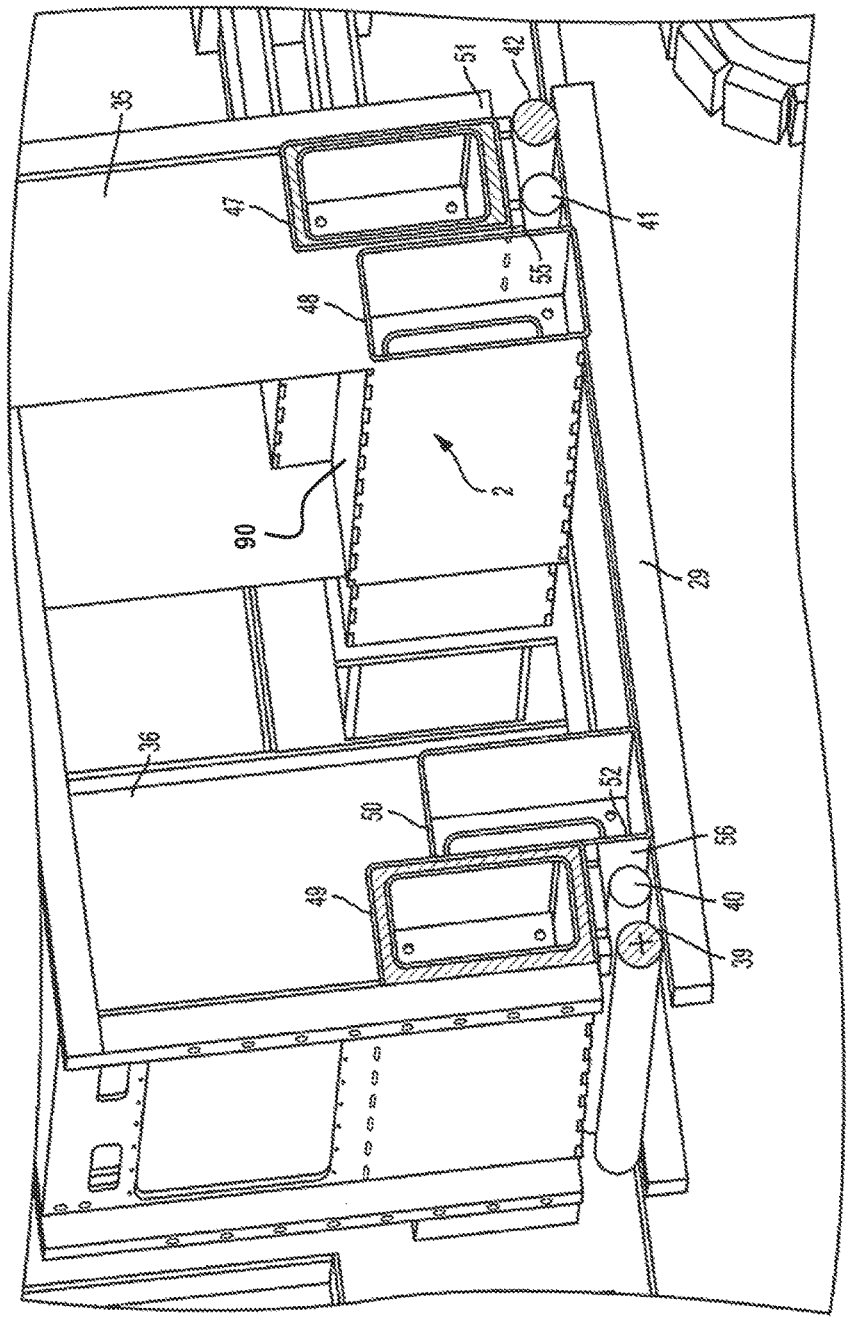

FIG. 3: Perspective cross-section through the frame (2, 3) near the raised walls 35, 36 of the machine as shown in FIG. 1.

DESCRIPTION OF THE INVENTION

With reference to FIG. 1, the machine is, analogous to the existing machines for realizing concrete pavements, built up from a skeleton (1) that is formed by two parallel support beams (8, 9) and crossbars perpendicular to them (10, 11, 12, 13), which are retractable and expandable within a frame (2, 3), in order to be able to change to machine's working width. The ends (14, 15, 16, 17) of the parallel support beams have been fitted with rollers (18, 19, 20, 21) that facilitate the machine moving in the right direction.

Typical to this invention is that, besides the frame, a between frame (4, 5, 6, 7) has also been provided. This between frame, also referred to as middle frame, facilitates shortening of the frame (2, 3) being possible without loss of strength and pushing open the machine, steplessly, from a closed condition of 2.5 m to 6 meter in width.

An additional feature of the machines in accordance with this invention pertains to the configuration of the frame. In the existing machines, the frame is typically built up from four sleeves set up in four quadrants, whereby two overlaying sleeves form a guide for the crossbars that are connected to one side with the support beam, while the other diagonally placed sleeves form a guide for the crossbars that are connected to the other side with the support beam (see FIG. 4 from BE1002820). In the present configuration, the frame consists of two sleeves (47, 48) and (50, 49) in a stepped arrangement, in which the bottom step (48, 50) is located on the inside of the skeleton forming a recessed ledge (90) from a top external surface of the bottom step (48, 50) and a side external surface of the corresponding top step (47, 49). This makes more space available at the top, between the frames, and the resources for operating the machine, such as the motor and the control devices can entirely/partially be lowered between the frames, such as onto the recessed ledges (90). The stepped arrangement of the sleeves in the frame also allows the cylinders (39, 40, 41, 42), to push open and close the frame, to move to the bottom of the frame. In this way, there are two cylinders per support beam whereby the expansion and contraction of the skeleton can be done in a much more symmetrical and controlled manner, and jamming of the angled crossbars in the frame can be prevented. Compared with the frames with four sleeves, the stepped set-up of the sleeves also ensures weight savings. Notwithstanding the fact that the crossbars of this invention are, compared with the crossbars from the aforementioned prior art, typically made twice as high, the horizontal connection, in both the frame and the composite crossbars, is no longer needed and, accordingly, less material is required and the weight of the machine is much less in comparison with machines from the prior art.

As already indicated above, the motor can be lowered into the frame due to the stepped set-up of the frame. In a design such as this invention and as indicated in FIG. 1, the machine can be fitted with an engine room (24), whereby this engine room is formed by raised walls (33, 34, 35, 36, 37, 38) that are connected to the frame (2, 3). These walls could be provided with one or more openings to take care of the required ventilation and cooling of the engine room. Independently to the presence or absence of the aforementioned raised walls, the parallel frames (2, 3) will always be connected to each other by means one or more connecting element(s), and particularly with connecting ribs (25, 26, 27,

28, 29, 30, 31, 32). The previously mentioned middle frames (4, 5, 6, 7) are preferably also connected to each other. Because this connection would not hamper closing and opening the machine by sliding, the connection will preferably consist of a connection plate (43, 44), which is fitted on the short side off or on the middle frames. This connection plate will also serve as stop for the middle frame (4, 5, 6, 7) and the support beam (8, 9).

Another feature of the machine in accordance with this invention is the presence of control elements (56) provided in the frame, and optionally in the middle frame (57). In this regard, both the frame and the middle frame are manufactured from lasered panels, in particular from jagged lasered panels. Prior to the panels being connected to each other, grooves are milled at a number of places where the wear-resistant panels of a suitable thickness, for example, a hundred millimeters, are fastened with screws. By also fitting these panels with adjusting screws, analogously to the clamp connection clamp as shown in FIG. 4 of BE1002820 (No. 61 in FIG. 4 of BE1002820), every clearance between the frame, middle frame and the crossbar will be removed and sagging of the machine will be prevented. Analogously to the control elements, the frame (2, 3) and the middle frame are also fitted with guiding elements (51, 52, 53, 54). These guiding elements consist of wear-resistant panels that are fitted in the milled notches on the inside of the frame (2, 3) and the middle frame. The craftsman is familiar with the materials that have to be used for constructing these machines and also knows that the material to be used for the wear-resistant panels has to have a hardness that is higher than that of the frame, between frame and crossbar. The latter is typically manufactured from high-grade steel such a S355 and S700. In a preferred form of the current invention, these elements are manufactured from high-grade steel S700, the latter permits a further weight reduction in the machine.

In the configuration shown, the machine is provided with an engine room where the motor is situated perpendicular to the driving direction and the frame (2, 3). Insofar as the openings in the raised walls can take care of the required ventilation and cooling when the machine is opened, the support beams (8, 9) will seal the engine room sideways in the closed state. To prevent the cooling of the engine room being compromised by this, the support beams are preferably provided with window-shaped openings (22, 23) in the sidewalls (34, 35, 26, 27) of the engine room. In this way, in a manner of speaking, a wind tunnel is created by which, from the one side, cold air could be sucked in, and on the other side, the hot air could be expelled.

The invention claimed is:

1. A device for realizing surfacing, the device comprising: a skeleton formed by two parallel support beams and crossbars perpendicular to the parallel support beams, wherein:
    the crossbars are retractable and expandable within frame elements and middle frame elements, and the middle frame elements are retractable and expandable within the frame elements in order to be able to change to the device's working width,
    wherein:
        the frame elements each comprise a stepped configuration with a bottom step and a top step,
        each of the bottom step and the top step comprise a sleeve as a guide for expansion and contraction of the crossbars within the frame elements, and
        the bottom step of each frame element is located at the inside of the skeleton such that a recessed ledge is formed on an external surface of the bottom step; and
    the ends of the parallel support beams have been fitted with rollers that facilitate movement of the device.

2. The device according to claim 1, wherein the skeleton is steplessly extendable.

3. The device according to claim 2, wherein the device comprises resources for steplessly extending the skeleton, and wherein the resources comprise pressure cylinders set at the bottom of the frame elements.

4. The device according to claim 1, wherein the device comprises an engine room.

5. The device according to claim 4, wherein the engine room is formed by raised walls connected to the frame elements.

6. The device according to claim 5, wherein the raised walls are provided with one or more openings.

7. The device according to claim 1, wherein the frame elements are connected to each other by one or more connection elements.

8. The device according to claim 1, wherein at least some of the middle frame elements are connected to each other.

9. The device according to claim 8, wherein at least some of the middle frame elements are connected to each other by a connection plate.

10. The device according to claim 1, wherein the frame elements and the middle frame elements have been fitted with control elements.

11. The device according to claim 1, wherein the device comprises guiding elements, and wherein the guiding elements comprise wear-resistant panels that are secured by milled notches on the inside of the frame elements and/or the middle frame elements.

12. The device according to claim 11, wherein the guiding elements consist of wear-resistant panels that are secured by milled notches on the inside of the frame elements and the middle frame elements.

13. The device according to claim 1, wherein a motor is located perpendicular to the driving direction and between the frame elements.

14. The device according to claim 11, wherein the parallel support beams are provided with window-shaped openings.

* * * * *